July 25, 1967  F. O'CONOR ET AL  3,332,555
LAUNDRY MACHINE
Filed July 13, 1965  2 Sheets-Sheet 1
FIG. 1
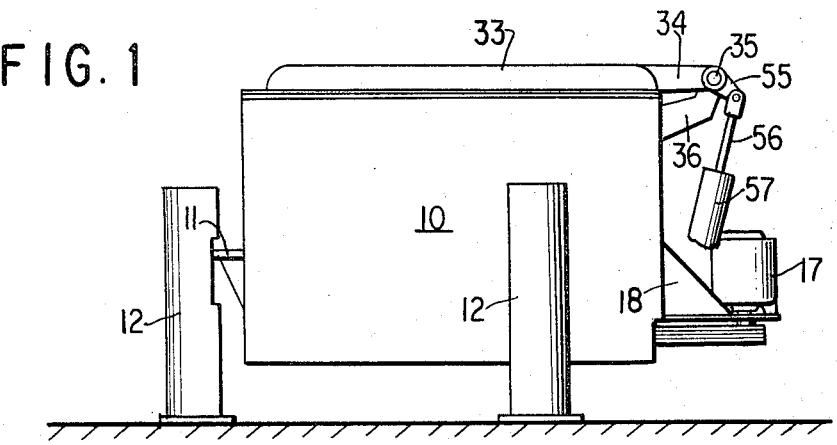
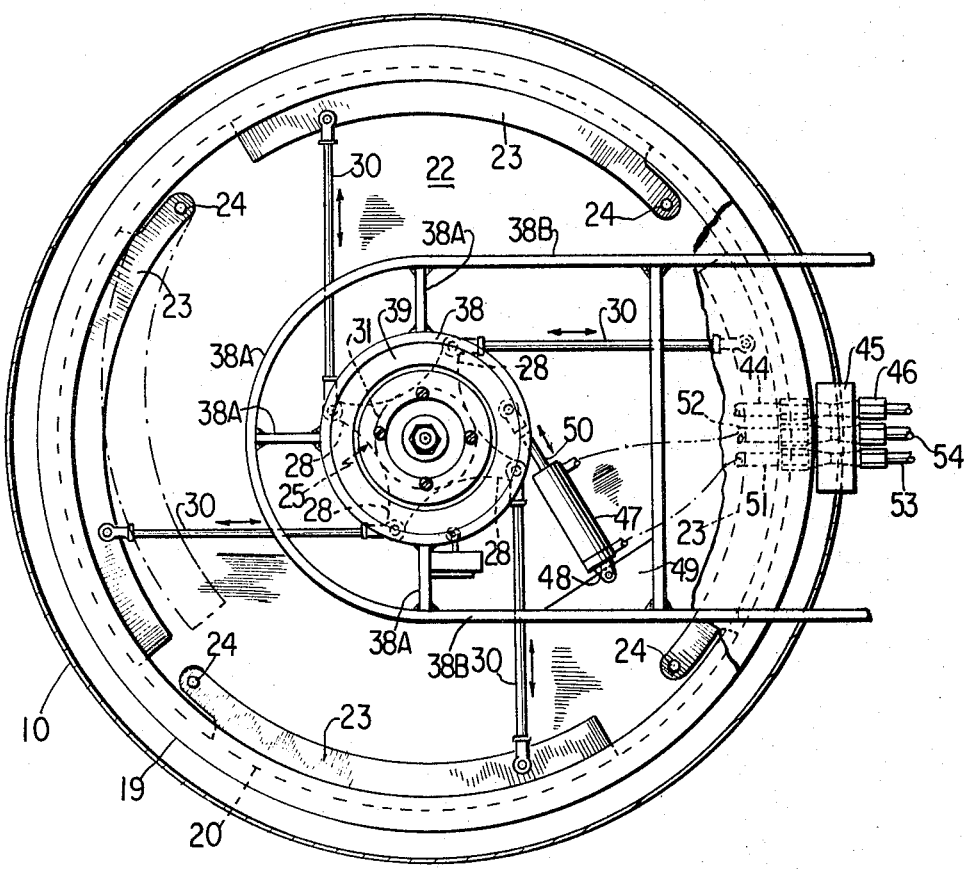
FIG. 3
INVENTORS
FRANK O'CONOR
JOHN W. SHERLOCK
BY
Robertson Smythe Bryan
ATTORNEYS

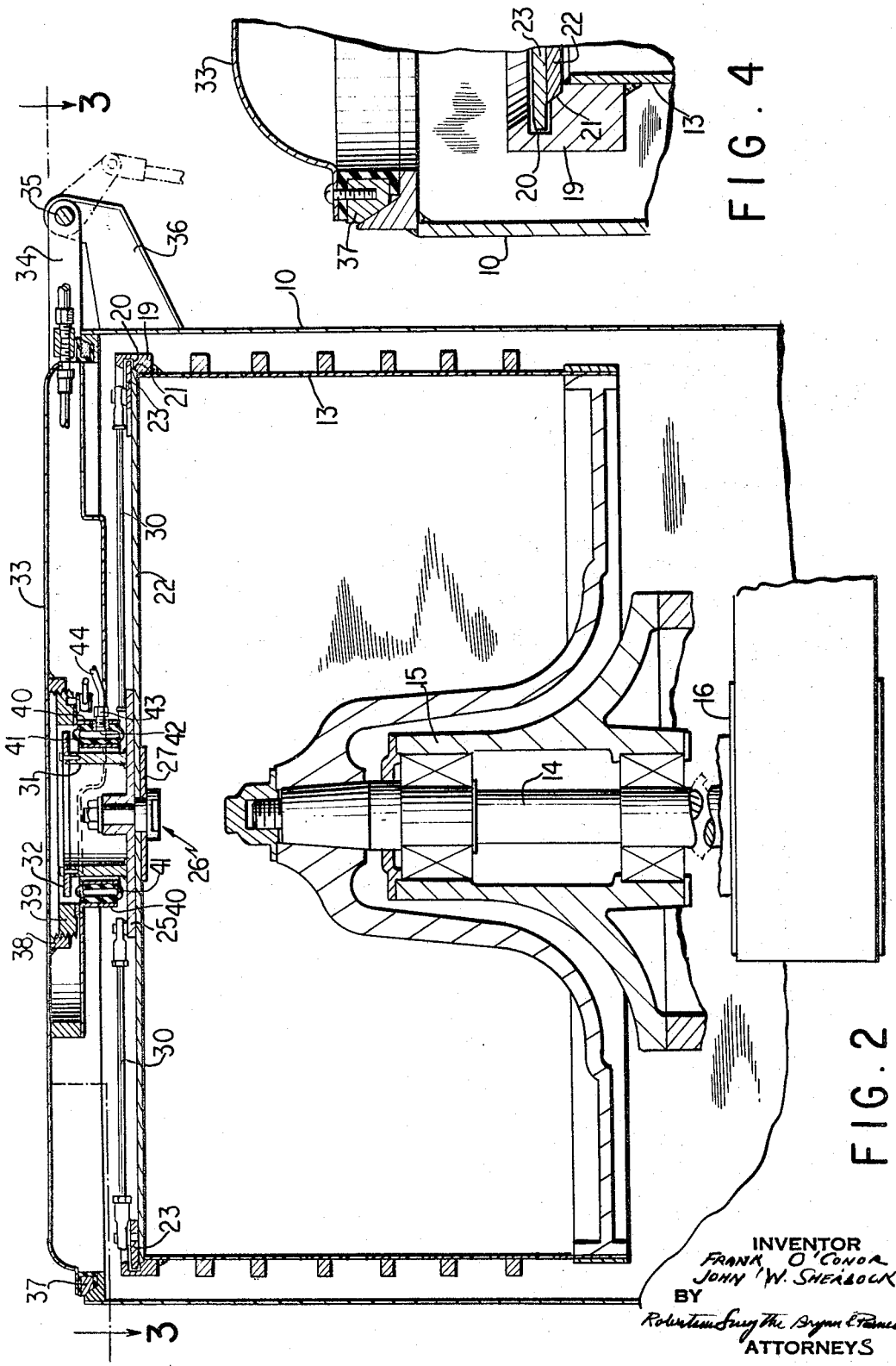

United States Patent Office 3,332,555
Patented July 25, 1967

3,332,555
LAUNDRY MACHINE
Frank O'Conor, Moline, and John W. Sherlock, East Moline, Ill., assignors to Ametek, Inc., New York, N.Y., a corporation of Delaware
Filed July 13, 1965, Ser. No. 471,656
3 Claims. (Cl. 210—360)

ABSTRACT OF THE DISCLOSURE

A centrifugal apparatus having a housing with an outer openable cover and inner cover, the inner cover having locking means for locking it to the basket but releasable and openable with the outer cover. There is an oscillatable drum on the outer cover and an oscillatable drum on the inner cover with a gripping device between the two for operating the locking means. When the gripping device is energized, the inner cover is locked to the outer cover.

---

This invention relates to centrifugal separators, and particularly to an improved inner cover for the basket of a centrifugal separator.

Inner baskets of centrifugal separators often require covering to prevent the solid materials therein from being thrown out the upper open end of the basket.

Many attempts have been made to provide a satisfactory inner cover for the spinning basket of a centrifugal separator, but by and large, such attempts have not proven too successful. Some require separately opening the outer cover, then unlocking the inner cover and separately removing it. Others involve complex linkages that have not been too reliable.

The principal object of this invention is to provide a centrifugal separator having a combined outer cover and inner cover for the basket in which both may be removed as a unit in opening the separator.

Another object of the invention is to provide such a separator in which the inner cover is capable of being locked to the top of the basket, and to rotate therewith.

Still another object of the invention is to provide such a separator in which the locking means is caused to move toward locking position before spinning of the basket of the separator.

A further object of the invention is to provide such a separator in which fluid-operated means is employed to lock and unlock the inner cover on the basket.

Still another object of the invention is to provide such a separator in which fluid-operated means is employed to connect the inner and outer covers together during opening and closing of said separator.

In one aspect of the invention, a centrifugal separator may comprise a housing within which a basket may be mounted for rotation about a vertical axis. The housing may be suitably supported above the floor, and a motor mounted on a bracket fixed to the housing may drive V-belts that connect with a pulley at the lower end of a spindle to which the basket is fixed.

In another aspect of the invention, the upper end of the housing may be open, and a cover therefor may be pivotally connected to the housing that is adapted to be pivoted open or closed.

In still another aspect of the invention, the upper edge of the basket may include an internal peripheral locking groove. An inner cover plate may be provided for the basket and it is adapted to rest on the top of the basket with its top surface flush with the bottom surface of the internal peripheral groove.

In a further aspect of the invention, a series of arcuate locking shoes may be pivoted to the top of the inner cover in a fashion such that they can be pivoted outwardly so a portion of each shoe is received within the internal groove. There may be a spider, having an upstanding drum attached thereto, rotatably mounted at the center of the inner cover, which spider connects to said shoes through links.

In a still further aspect of the invention, there is a rotatable member on the inner surface of the outer cover to which an inflatable tubular element is attached in position to cooperate with the drum.

In still another aspect of the invention, a cylinder may be pivotally mounted on the inside surface of the outer cover and its piston rod may be connected to the spider for oscillating the latter so as to lock and unlock the inner cover to the basket.

In operation, with the separator closed and having just completed a centrifuging operation with the basket at rest, air is admitted to the expandible tube causing it to grip the drum. Air is then admitted to the cylinder, extending its piston rod and thereby turning the spider which pivots the arcuate shoes to unlock position. With the air still on in the expandible tube, the upper cover is pivoted open and the inner cover moves with it by virtue of the tubular expandible member acting on the drum which is fixed to the inner cover.

The above, other objects and novel features of the improved separator with an inner cover for the basket will become apparent from the following specification and accompanying drawings which are merely exemplary.

In the drawings:

FIG. 1 is an elevational view of a centrifugal separator to which the principles of the invention have been applied;

FIG. 2 is a sectional elevational view of a portion of the separator shown in FIG. 1;

FIG. 3 is a sectional view taken substantially along line 3—3 of FIG. 2; and

FIG. 4 is an enlarged detail of the invention.

Referring to the drawings, the principles of the invention are shown as applied to a centrifugal separator including a housing 10 that includes brackets 11 spaced at three equal points about housing 10. The brackets 11 are connected to means within standards 12 for permitting slight oscillatory movement of housing 10 incident to the centrifuging action.

Referring to FIG. 2, a basket 13 having a perforated exterior is fixed to a vertical spindle 14 journaled in a bearing 15. Spindle 14 extends downward below basket 13 and supports a pulley 16 that is belted to a pulley on the drive shaft of a motor 17 (FIG. 1) that is mounted on a bracket 18 fixed to housing 10.

Referring to FIG. 2, the top of the basket 13 is provided with an integral ring 19 having an internal groove 20 therein and a beveled edge 21 for centering an inner cover 22 that is of a diameter and includes a bevel edge adapted to be supported on the beveled edge 21 of the ring 19 as well as the top edge of the basket wall.

Referring to FIG. 3, inner cover 22 has arcuate shoes 23 pivoted to it by pins 24. These shoes follow the contour of the outer edge of the cover 22 and when pivoted clockwise (FIG. 3), a substantial portion of each shoe 23 is received within the internal groove 20 thereby to lock cover 22 to basket 13.

A spider 25 may be oscillatably mounted at the center of cover 22 by a nut and bolt means 26 and a disk 27. The spider may have arms 28, at the outer end of each of which a rod 30 may be pivotally connected. The opposite ends of each of the rods are pivoted to one of the arcuate shoes 23 at its end opposite its pivotal connection to cover 22. Accordingly, by oscillating the spider 25, it is apparent that shoes 23 can be moved from a position with a substantial portion thereof within the groove 20, thereby locking cover 22 to basket 13, to a position where said shoes are removed from said groove, thereby unlocking cover 22 from basket 13.

Referring to FIG. 2, the spider 25 includes an integral upstanding drum 31 having a ring 32 fixed to its upper end for a purpose to be described later. An outer cover 33 may include arms 34 that are fixed to a shaft 35 journaled in a bracket 36 that is attached to the outside of housing 10. The cover may include a sealing ring 37 that cooperates with a sealing surface on the top edge of housing 10. Within the outer cover 33, and located centrally thereof, a ring 38 may be rigidly secured. Referring to FIG. 3, ring 38 may be supported by braces 38A that are, in turn, connected to a rib 38B that extends outward beyond the outer cover 33 forming the arms 34. The ring 38 may include internal threads that receive external threads of another ring 39. The threads are such that limited oscilatable movement of ring 39 can be effected. At initial assembly the threads also provide a vertical adjustment for centering the air clutch vertically on the drum.

A flanged tubular housing 40 is fixed in concentric relation with ring 39. A flexible, expansible tubular member 41 of toroidal shape has its outer wall integrally attached to the inner wall of member 40, and its opposite wall spaced slightly from the cylindrical outer surface of drum 31.

The expansible member 41 includes an inlet 42 adapted to receive a fitting 43 at one end of a flexible line 44, the opposite end of line 44 being connected to a block 45 adapted to receive a connector 46 that supplies air under pressure to the line 44.

In order to oscillate spider 25, a cylinder 47 may have its blank end 48 pivotally connected to a bracket 49 attached to rib 38B. The piston rod 50 of the piston within cylinder 47 may be connected to spider 25 in a manner to provide a tangential thrust thereto. The blank end of cylinder 47 may be connected to a line 51 while the rod end may be connected to a line 52, both being connected to the block 45 to which supply lines 53 and 54 are connected.

Referring to FIG. 1 again, the shaft 35 has a link 55 rigidly connected to it, the opposite end of which is connected to a piston rod 56. The piston of rod 56 reciprocates within a cylinder 56 that is connected at its blank end to the bracket 18. Admission of air under pressure to the rod end of cylinder 57 while exhausting the blank end raises cover 33 about the pivot 35.

With the apparatus in the condition shown, and assuming that rotation of the basket has stopped, admission of pressure air into line 44 expands tubular element 41 to cause its inner wall to forcibly engage the outer surface of drum 31. Thereafter, admission of pressure air into the blank end 48 of cylinder 47 extends rod 50, turning spider 25 counterclockwise (FIG. 3) to retract shoes 23 from groove 20, thereby unlocking inner cover 22 from basket 13.

While pressure is still on in lines 51 and 44, admission of pressure air to the rod end of cylinder 57 pivots outer cover 33, and with it inner cover 22 (since the tubular element 41 is expanded into contact with drum 31), about pivot 35, thereby opening the separator.

When it is desired to close the outer cover 33 and inner cover, locking the latter to basket 13, the following steps are followed. First, the cylinder 57 is exhausted from the rod end and the blank end is pressurized, causing closing of the outer cover 33 and with it the inner cover 22. Next, the blank end of cylinder 47 is exhausted while pressure air is applied to the rod end. This forces arcuate shoes 23 into groove 20 to lock the inner cover 22 to basket 13. Then, line 44 is exhausted, freeing drum 31 from the expansible element 41. In this condition, basket 13 is free to rotate and has a locked cover attached to it and rotatable with it.

Although the various features of the improved separator with a lockable inner cover have been shown and desscribed in detail to fully disclose one embodiment of the invention, it will be evident that changes may be made in such details and certain features may be used without others without departing from the principles of the invention.

We claim:

1. In a centrifugal separator, a housing having an open upper end; a basket mounted in said housing for rotation about a vertical axis; a ring at the top of said basket having an internal groove therein; an inner cover for said basket; arcuate shoes pivotally mounted on said inner cover; an oscillatable spider connected to said inner cover; rods connecting said spider to said arcuate shoes, whereby upon oscillating said spider, said arcuate shoes move into said groove to lock said inner cover to said basket; an outer cover for closing the open end of said housing; a pivotal mounting for said outer cover; oscillatable means mounted on said outer cover adapted to grip means on said spider; means connected to said outer cover for oscillating said oscillatable means on said outer cover; and fluid operated radially expansible means for causing said oscillatable means on said outer cover to be effective to grip the oscillatable means on said spider, whereby said spider can be oscillated to lock and unlock said inner cover to said basket when in gripping relation, as well as to act as a connecting means between said inner and outer covers so that the two can be pivoted to open position and closed position together.

2. In a centrifugal separator, a housing having an open upper end; a basket mounted in said housing for rotation about a vertical axis; a ring at the top of said basket having an internal groove therein; an inner cover for said basket; arcuate shoes pivotally mounted on said inner cover; an oscillatable spider connected to said inner cover; rods connecting said spider to said arcuate shoes, whereby upon oscillating said spider, said arcuate shoes move into said groove to lock said inner cover to said basket; an outer cover for closing the open end of said housing; a pivotal mounting for said outer cover; oscillatable means mounted on said outer cover adapted to grip means on said spider; fluid-operated means connected to said outer cover for oscillating said oscillatable means on said outer cover, and fluid operated radially expansible means for causing said oscillatable means on said outer cover to be effective to grip the oscillatable means on said spider, whereby said spider can be oscillated to lock and unlock said inner cover to said basket when in gripping relation, as well as to act as a connecting means between said inner and outer covers so that the two can be pivoted to open position and closed position together.

3. In a centrifugal separator, a housing having an open upper end; a basket mounted in said housing for rotation about a vertical axis; a ring at the top of said basket having an internal groove therein; an inner cover for said basket; arcuate shoes pivotally mounted on said inner cover; an oscillatable spider connected to said inner cover; rods connecting said spider to said arcuate shoes, whereby upon oscillating said spider, said arcuate shoes move into said groove to lock said inner cover to said basket; a drum on said spider; an outer cover for closing the open end of said housing; oscillatable means mounted on said outer cover; inflatable tubular means between said drum and said oscillatable means on said outer cover; means connected to said outer cover for oscillating said oscillatable means on said outer cover; and means for inflating said tubular means to provide a gripping action between said drum and said oscillatable means on said outer cover, whereby said spider can be oscillated to lock and unlock said inner cover to said basket, as well as to act as a connecting means between said inner and outer covers so that the two can be pivoted to open position and closed position together.

References Cited

UNITED STATES PATENTS 2,907,464    10/1959    Ellis _____ 210—146 X

FOREIGN PATENTS 223,163    9/1962    Austria.

REUBEN FRIEDMAN, *Primary Examiner.*

J. DE CESARE, *Assistant Examiner.*